3,600,381
CAPROLACTAM PURIFICATION PROCESS
Akira Yamamoto, Makoto Yasuda, and Yutaka Furusawa, Mihara-shi, Hiroshima-ken, Japan, assignors to Teijin Limited, Kita-ku, Osaka, Japan
No Drawing. Filed Apr. 21, 1969, Ser. No. 818,155
Claims priority, application Japan, May 9, 1968, 43/31,291
Int. Cl. C07d 41/06
U.S. Cl. 260—239.3                                    4 Claims

ABSTRACT OF THE DISCLOSURE

A method for the preparation of pure lactam from an oligomer-containing crude lactam by evaporating said oligomer-containing crude lactam at a temperature less than the evaporation temperature of said lactam while maintaining said lactam under alkaline conditions and then rectifying said oligomer-containing crude lactam. Further purification of the crude lactam remaining after rectification can be carried out by depolymerization of said crude lactam in the presence of an acidic catalyst at a temperature within the range from about 220° C. to about 350° C. and at a pressure within the range from about 0.5 to about 6 atmospheres, separating a lactam aqueous solution, oxidizing said lactam aqueous solution until the permanganate number of the lactam is below 1.50, reducing the water content from said lactam aqueous solution to at least about 5%, and recirculating said lactam aqueous solution to said evaporating step.

BACKGROUND OF THE INVENTION

This invention relates to the purification of epsilon-caprolactam containing lactam-oligomers. More particularly it relates to the purification of epsilon-caprolactam containing lactam-oligomers by evaporating said oligomer-containing crude lactam at a temperature less than the evaporation temperature of lactam while maintaining said lactam under alkaline conditions and then rectifying said oligomer-containing crude lactam.

Epsilon-caprolactam, hereinafter generally called "caprolactam" or "lactam" is a valuable starting material for preparing linear polyamides having utility in the form of filaments, extruded articles, molded articles, etc. A high quality or pure caprolactam is required to obtain the quality necessary in polyamides prepared therefrom.

A pure lactam can be prepared by repeatedly subjecting the recovered crude lactam to various combinations of such operations as filtering, evaporation, crystallization, distillation, extraction, adsorption and desorption.

It is known that oligomers can be removed from a lactam washing water by filtering and the filtrate can then be further purified. Such a method is defective in that the oligomers upon being filtered form a sticky mass which is very difficult to handle.

It is also known to remove oligomers by evaporating lactam only from an oligomer-containing lactam. In this method, however, the fluidity of the material lactam is reduced as the amount of oligomers in the residue increases and the recovery ratio of lactam cannot be increased unless the evaporating temperature is elevated. However, when the evaporating temperature is elevated, the quality of the evaporated lactam is degraded, rendering the subsequent purification process difficult. Thus with this method it is impossible to obtain a high lactam recovery ratio and a high quality lactam simultaneously.

In both filtering and evaporating methods, some lactam is lost along with the oligomers during the removal of the oligomers and therefore the lactam recovery ratio is markedly lowered when a recovered crude lactam to be treated contains large amounts of oligomers.

Oligomers can also be removed by a so-called depolymerization process. However, this process requires an elevated temperature in the range of 200° C. or higher and in addition, the quality of the resultant lactam is lowered due to the secondary effect of a depolymerization catalyst used.

Lactam quality is judged by evaluation of various properties of the lactam. A great importance is attached to the content of reducing impurities in a lactam as such impurities must be removed within certain limits. For determining the quantity of the reducing impurities, one method which is frequently employed is wherein 10.0 grams of lactam is dissolved in distilled water to obtain 1 liter of uniform aqueous solution. 50 ml. of the solution is placed in a 150 ml. beaker using a pipet. After adjusting the temperature to $25 \pm 0.5°$ C., 1.0 ml. of 0.01 N $KMnO_4$ aqueous solution is added to the sample and at the same time a stop watch is set in motion. 250 seconds after the sample and the $KMnO_4$ aqueous solution are mixed, the absorbance of the sample solution is measured by means of Beckmann Model B Spectrophotometer, using a ray of 410 ml. in wave length, with an optical path length of 5 cm. and an initial sensitivity of 1. Then, 50 ml. of distilled water is charged in a 150 ml. of beaker and after adjusting the temperature at $25 \pm 0.5°$ C., 1.0 ml. of 0.01 N $KMnO_4$ aqueous solution is added to the sample. The absorbance of the resultant mixture is measured in 250 seconds later, under exactly the same conditions in the case of the aqueous sample solution of the lactam and the measured value is used as a blank absorbance. In this case, it is defined that Permanganate number = (sample absorbance
$$- \text{blank absorbance}) \times 100$$

and the permanganate number is represented by PN.

The color of the lactam is also an important characteristic. 80.0 g. of the lactam is dissolved in distilled water so as to obtain 200 ml. of uniform aqueous solution and the solution is filtered by a Büchner funnel having a glass disc of intermediate mesh. Corning glass filter No. 5330, a neutral gray filter of 50% permeability and No. 7 reduction plate are placed in Lumetron colorimeter in the optical path of a balance cell and the colorimeter is set at 100% with distilled water in a cell of 6 inches in optical path, and the transmittance of the sample solution is determined.

Color number (100% basis)
$$= \frac{(2.000 - \log 10\% \text{ transmittance}) \times F^* \times 100}{40}$$

wherein $F^*$ is specific for each colorimeter and is obtained by the inclination of a color standard vs. percent transmittance curve of the particular colorimeter which is plotted by determining the percent transmittance of APHA color standards.

The solidifying point is also one of the important characteristics of a lactam relative to the presence of impurities. A sample lactam is molten at a temperature which is not higher by 10° C. or more than the melting point of the sample lactam and poured in a preheated 8 inches x 1 inch Pyrex test tube in a depth about half of said tube, to which 5 g. of molecular sieve type 4A Linde powder. The test tube is inserted in a 6-inch-high, 8-ounce bottle, with the bottom thereof resting on a cotton or paper towel stacked in the bottom of said bottle in a height of 1 inch, in such a manner that the test tube does not directly contact the bottle except at the neck of the bottle. The sample is allowed to cool. The content of the test tube is stirred with a thermometer scaled at an interval of 0.2° C. As the sample lactam begins to crystallize, the temperature becomes highest and the sample lactam is continuously stirred until the temperature thereof is stabilized. The solidifying point is obtained by applying the correction value of the thermometer to the highest temperature value.

The amount of volatile bases formed is also one of the important characteristics relating to the quality of a lactam. In a lactam which is prepared by the Beckmann rearrangement of oxime, which is the most commonly used method, the mixing of by-products and the substances resulting from decomposition of the lactam are the major causes of formation of volatile bases. On the other hand, in a lactam obtained from a recovered crude lactam, the substances in the lactam, which result from decomposition of the lactam are the major causes of formation of volatile bases. Using Kieldahl apparatus No. JM-3066 of Scientific Glass Apparatus Company or an apparatus equivalent thereto, 200 ml. of distilled water is poured in the steam generating flask thereof and heated to the boiling point. 10.0 ml. of $\frac{1}{10}$ N hydrochloric acid and a mixture of two indicators (40 ml. of bromocresol green indicator solution and 8 ml. of methyl red indicator solution) are charged in a 250 ml. of Erlenmeyer flask and the flask is placed below a condenser, with the tip end of the condenser located below the surface of the solution. 20.0 g. of a sample is charged in the Kieldahl flask and the flask is fastly secured to the apparatus. 20 ml. of 1 N sodium hydroxide solution is added. The stock cock is closed immediately and steam is passed through the flask to boil the content. By distillation, about 150 ml. of distillate is accumulated in the Erlenmeyer flask. A drop of the condensate is tested with a Brilliant Yellow Paper. If the paper turns to orange or red color, the distillation is continued until the test result becomes negative. The content of the Erlenmeyer flask is titrated with $\frac{1}{10}$ N sodium hydroxide solution and the amount of volatile bases is obtained by the amount of hydrochloric acid consumed by the volatile bases.

The above-described testing method is well known among those skilled in the art as a qualification method for lactams. Besides the volatile bases, the content of free acids, free alkalis, iron component, cobalt component, water, water insoluble component or ash component is tested but the contents of these components are not so large as to be objectionable for the production of nylons unless a problem occurs during the production process or handling.

Caprolactam is generally prepared industrially using hydrocarbons (e.g. benzene and cyclohexane, etc.) as the starting material. The caprolactam thus prepared and used as the starting material for the production of high quality nylon 6 polymer is required to have the following properties:

Permanganate number (PN)—15 or smaller (most preferably not larger than 10)
Color number (APHA)—20 or smaller
Solidifying point—69.0° C. or higher
Amount of volatile bases—1.0 ml. equivalent/kg. or smaller A lactam of the quality above described will be hereinafter referred to as pure lactam. For preparing a pure lactam, special care is required in the purification process and even a slight change in the preparation conditions will result in the formation of hardly separable impurities which frequently makes it impossible to obtain the aforesaid properties simultaneously.

The lactam recovered during the production of a polymer contains substances which result from the decomposition of the lactam caused by the exposure to a high temperature for a prolonged period during the polymerization reaction. Further, the lactam recovered contains various additives which are used for the production of a polymer, and also substances resulting from the decomposition of these additives. The lactam also contains oligomers. As such, the lactam recovered contains a variety of impurities, so that it has been very difficult to obtain a lactam, which satisfies the aforesaid four conditions simultaneously, by purification. Therefore, in using the lactam, obtained by the purification of the recovered lactam, as the starting material again for polymerization, it has been customary:

(a) To prepare a polymer which is somewhat low in quality, using the lactam only which is obtained by purifying the recovered lactam, and use said polymer for applications for which the quality requirement is not so severe, or (b) To mixing the small amount of the lactam, which is obtained by purifying the recovered lactam, with a large amount of pure lactam prepared from hydrocarbons, thereby to produce a lactam which as a whole enables the required quality conditions to be satisfied, and use such lactam for the intended purpose.

The use of a recovered crude lactam containing a larger amount of oligomers is disadvantageous over the use of a recovered crude lactam containing a lesser amount of oligomers, in the light of the fact that the removal of the oligomers is troublesome an the yield of pure lactam is lowered. The recovery ratio of lactam may be improved by employing a method weherein the oligomer component only is removed by evaporating the lactam component from an oligomer-containing lactam, or by subjecting the oligomer-containing lactam to depolymerization process, but in this case, the result has been always that the purification process becomes more difficult due to an increase of the substances resulting from decomposition of the lactam. As will be seen from the foregoing, in the purification of a recovered crude lactam for obtaining a lactam of a quality as good as that of pure lactam, high yield of purified lactam and economy of purification process have not been compatible with each other and this tendency has been more apparent when use is made of a recovered crude lactam containing a large amount of oligomers.

An object of the present invention is to obtain a pure lactam at high yields by purifying an oligomer-containing recovered crude lactam.

Another object of the present invention is to obtain a pure lactam economically by purifying an oligomer-containing crude lactam by evaporation wherein the temperature is maintained at less than the evaporation temperature of the lactam while maintaining said lactam under alkaline conditions and then rectifying said oligomer-containing crude lactam.

Other objects of the invention will become apparent from the following description.

It has been found that the objects of the present invention can be attained by treating an oligomer-containing recovered crude lactam in the following manner. First of all, an oligomer-containing recovered crude lactam is evaporated at a temperature below the evaporation temperature of the lactam, that is, 150° C., while maintaining the crude lactam alkaline. This step will be hereinafter referred to as evaporation step. By removing components which are lower in boiling point than the lactam and components which are higher in boiling point than the lactam from the lactam evaporated in the evaporation step by rectification, a pure lactam is obtained. In the evaporation step, oligomers remain without being evaporated which contain a considerable amount of lactam. These oligomers are drawn from the bottom of the evaporator and sent to a deploymerization step. In the depolymerization step, the oligomer-lactam mixture placed in a depolymerizing apparatus is maintained at a temperature of 220 to 350° C. and aqueous vapor is fed in the apparatus in the presence of an acidic catalyst while maintaining the interior pressure of the apparatus at an absolute pressure of 0.5 to 6 atmospheres. A mixture of aqueous vapor and ε-caprolactam is withdrawn from the apparatus, whereby an aqueous solution of lactam is obtained. The aqueous solution of lactam obtained from this depolymerization step will hereinafter be referred to as depolymerized aqueous lactam. When the permanganate number (PN) of the lactam component in the depolymerized aqueous lactam is 1.50 or larger, the depolymerized aqueous lactam is subjected to oxidation to lower the permanganate number of the lactam component below 1.50. The water content of the depolymerized aqueous lactam whose permanganate number is now below 1.50 is reduced to 5% or below by removing water therefrom. The depolymerized aqueous lactam is then joined with an oligomer-containing recovered crude lactam (the water content being not higher than 5%) and supplied to the aforesaid evaporation step while maintaining the mixture alkaline, or the depolymerized aqueous lactam having a permanganate number of 1.50 or below is mixed with an aqueous solution of oligomer-containing recovered crude lactam and after reducing the water content of the mixture to 5% or below by removing water therefrom, the mixture is supplied to the aforesaid evaporation step while maintaining said mixture alkaline. Therefore, in the normal state, a mixture of the oligomer-containing crude lactam and the depolymerized lactam is supplied to the evaporation step.

It was an unexpected discovery that when the recovered crude lactam is evaporated at a temperature of not higher than 150° C. in the evaporation step, components of lower boiling points than the lactam and components of higher boiling points than the lactam can be removed simply by rectification and a pure lactam can be obtained.

It was a further surprising new discovery that once the PN of the lactam component in the aqueous solution of lactam which is obtained by depolymerizing the evaporation residue (consisting mainly of an oligomer-lactam mixture) in the evaporation step by passing therethrough aqueous vapor in the presence of an acidic catalyst while maintaining the temperature of the residue at 220 to 350° C. and maintaining the absolute pressure at 0.5 to 6 atmospheres, has been reduced to 150 or below, if necessary by subjecting the depolymerized aqueous lactam to oxidation, a pure lactam can be obtained only by mixing the depolymerized aqueous lactam with a recovered crude lactam component, evaporating the lactam component in the evaporation step and removing components of lower boiling points than the lactam and components of higher boiling points than the lactam therefrom simply by rectification. Further, this depolymerization can be effected with the addition of not only the evaporation residue but also nylon 6 polymer with no adverse effect.

For this purpose, the evaporation temperature in the evaporation step is made low so that the evaporation residue may contain an extremely large amount of lactam and by subjecting the residue to a simple chemical treatment and rectification, a pure lactam can be obtained at high yields.

The evaporation residue is supplied to the depolymerization step. The crude lactam is maintained alkaline in the evaporation step and if the crude lactam contains a non-volatile alkali, the evaporation residue contains an alkali. The evaporation residue consists mainly of an oligomer-lactam mixture. Since the evaporation residue is delivered while being maintained at a temperature not higher than 150° C., it usually contains more lactam than oligomers. Nylon 6 polymer can also be depolymerized simultaneously with the evaporation residue. These materials to be depolymerized are maintained at a temperature of 220 to 350° C. in the depolymerizing apparatus and aqueous vapor is passed therethrough while maintaining the apparatus at an absolute pressure of 0.5 to 6 atmospheres. The depolymerized aqueous lactam is obtained by withdrawing a mixture of aqueous vapor and lactam vapor from the apparatus. The acidic catalysts suitably used include phosphoric acid, boric acid, and addition products and reaction products with the lactam. It is entirely satisfactory to carry out the depolymerization in the presence of the distillation residue (which is frequently tarry) produced as by-product during the polymerization. The kind and amount of the acidic catalyst used and further detail conditions for this step can be readily selected by those skilled in the art.

The materials to be depolymerized can be fed in the depolymerizing tank either continuously or by batch system. Where a polymer is to be depolymerized simultaneously, various methods can be employed for feeding the materials into the depolymerizing tank. For example, it is possible to supply the materials by containing them in a bag made with a cloth or film of nylon 6 or other high molecular compounds. Alternatively, the materials may be supplied in pieces. The selection of these methods and bag, etc. can be readily made by those skilled in the art.

The aqueous vapor distilled during the depolymerization step is in most cases overheated. Therefore, in preparing the depolymerized aqueous lactam by condensing the mixture of the aqueous vapor and the lactam vapor, the amount of condensed water can be adjusted by adjusting the cooling of a condenser, and accordingly the lactam concentration in the depolymerized aqueous lactam can be adjusted.

When the PN of the lactam component in the depolymerized aqueous aqueous lactam is higher than 150, the depolymerized aqueous lactam is subjected to oxidation to lower the PN to 150 or below. The oxidation may be effected at any temperature which is lower than the boiling point but higher than the condensing point of the lactam. A suitable oxidizer can be selected optionally from the group consisting of potassium permanganate, potassium bichromate, oxy acid metal salts of halogen, oxy acids of halogen and salts between metals having two or more valences (lead, copper, mercury, titanium, chromium, manganese, iron, cobalt, nickel, molybdenum and wolfram) and acids. The pH of the solution may be adjusted as required. Alternatively, the depolymerized aqueous lactam may be oxidized with hydrogen peroxide, air, oxygen and ozone and in this case an oxidation promoter may be added as required. Further detail conditions for the oxidation may be readily determined by those skilled in the art. This treatment may be carried out continuously or by batch process.

When a precipitate is formed in the depolymerized aqueous lactam as a result of oxidation, it is preferable to remove such precipitate as much as possible by filtering, centrifugal separation or settling. By so doing, the fear that the purification of the lactam is rendered difficult by the precipitate which is decomposed again in the subsequent steps, can be decreased.

The depolymerized aqueous lactam, after having the PN thereof reduced to 150 or below, is dehydrated and joined with a recovered crude lactam or is joined with aqueous solution of the recovered crude lactam and treated in the evaporation step in the form of a recovered crude lactam-depolymerized lactam mixture having a water content of not more than 5%.

By removing components of lower boiling points than the lactam and components of higher boiling points than the lactam by rectification from the lactam evaporated in the evaporation step, a pure lactam is obtained. If the lower boiling point components and the higher boiling point components can be removed completely by such fractional distillation, it appears to be natural that the impurities other than those which have the same boiling point as the lactam would be removed completely and thereby a pure lactam could be obtained. However, the purification of a lactam by rectification has been usually not easy because of the presence of components which can hardly be removed from the crude lactam by fractional distillation.

The lactam evaporated in the evaporation step from the recovered crude lactam and the depolymerized lactam according to the present invention can be purified into a pure lactam by removing the lower boiling point components and higher boiling point components therefrom by rectification, but in fact a major portion of the distillate which is the lower boiling point components to be removed, is a lactam. This lactam is occasionally different from pure lactam only in that the PN thereof is slightly higher than that of the latter. In this view, it may appear that it is advantageous to perform only the rectification for the removal of higher boiling point components and omit the rectification for the removal of lower boiling point components. However, the fact is that if the rectification for the removal of lower boiling point components is omitted, the quality of the pure lactam obtained by performing only the rectification for removing the higher boiling point components is inferior, though just slightly, to the quality of a pure lactam obtainable without omitting the rectification for the removal of lower boiling point components. This slight quality difference largely affects the value of the pure lactam to be used as a nylon polymerization material.

The distillate during the removal of lower boiling point components constitutes a loss as such. Therefore, it is preferable to reduce the amount of the distillate to minimum. For this purpose, it is practical to make the reflux ratio extremely large. The reflux ratio is preferably 20 or higher. Even when the reflux ratio is made extremely large, a major portion of the distillate is still lactam. An increase of impurities may be known from an increasing PN of the distillate. The quality of the final purified lactam will not be adversely affected by increasing the reflux ratio.

In the rectification operation for removing the higher boiling point components, the desired pure lactam is separated as a distillate, while the impurities remain in the distillation residue.

The temperature of the lactam is preferably not higher than 150° C. throughout the rectification step. Therefore, the pressure in the top of the rectification tower is desired to be 23 mm. Hg or lower in absolute pressure. Namely, the rectification operation falls in the category of vacuum distillation. While it is preferable for the lactam temperature to be 150° C. or lower, it is not objectionable at all for the wall temperature if a heater elevates to higher than 150° C. for heating the lactam as required in the rectification step.

According to the process of this invention, a pure lactam can be obtained even when a conventional rectifying apparatus is used for the removal of lower boiling point components and higher boiling point components. A rectification tower is preferably of the type wherein a pressure difference between the top and the bottom of the tower is small and in which the retention time of the lactam is short. For example, a rotary film-type rectification apparatus, rotary press column and packed tower are put in practical use, and one of them having a suitable specification may be selectively used. The selection of a suitable specification and more detail conditions of rectification can be readily made by those skilled in the art.

In practicing the process of this invention, the evaporation step and the rectification step are normally operated with a mixture of recovered crude lactam and the depolymerized lactam, but these steps may be operated with the recovered crude lactam or depolymerized lactam only. For instance, the evaporation and rectification steps may occasionally be operated with the recovered crude lactam only at the starting of the purification process. On the contrary, it is possible that these steps are operated with the depolymerized lactam only upon stopping of feeding of the recovered crude lactam. In either case, a pure lactam can be obtained according to the process of this invention.

In order to illustrate the present invention more clearly, examples thereof are provided hereunder, and it should be understood that these examples are only illustrative and should not be construed as showing the limit of the present invention. In the examples, all proportions are parts by weight unless otherwise specified.

EXAMPLE 1

A recovered crude lactam having an oligomer content of 10%, a PN of 90 and a color number of 300 or larger, is used. This recovered crude lactam is supplied at the proportion of 1000 parts/hour. In a first evaporation step, the lactam component is evaporated at 140° C. and an evaporation residue is withdrawn at the proportion of 350 parts/hour. Eight hours later, 2800 parts of evaporation residue accumulated is charged into a depolymerizing tank and after adding thereto 50 parts of phosphoric acid, superheated aqueous vapor at 380° C. is introduced at the rate of 1000 parts/hour while maintaining the temperature of the residue at 270° C. The distilled vapor is led into a concentration tower, associated with the depolymerizing tank, wherein the lactam component is concentrated and 40% aqueous lactam is obtained. The PN of the lactam component in the aqueous lactam is 330. Eight parts of $KM_nO_4$ aqueous solution is added to the depolymerized aqueous lactam and the mixture is stirred for 2 hours at 60° C. Then, $MnO_2$ formed is removed by centrifugal separation, whereupon the PN of the lactam component is 100.

By dehydrating the mixture, 2400 parts of depolymerized lactam is obtained. This depoymerized lactam is sent to a first evaporation step at the rate of 300 parts/hour. The lactam evaporated in the first evaporation step is rectified at the reflux ratio of 30 to remove lower boiling point components. The lower boiling point components removed have a PN of 40. The liquid in the bottom of the rectification tower is evaporated in a second evaporation step at 135° C. and then rectified at the reflux ratio of ¼ to remove higher boiling point components, whereby a pure lactam is obtained at the rate of 880 parts/hour. The liquid in the bottom of the rectification tower is sent to the second evaporation step and the evaporation residue in the evaporation step is returned to the first evaporation step. A small amount of concentrated NaOH solution is added to the lactams fed to the first and second evaporation steps to control the free base component in the lactams to 50 mil. equivalent per 1 kg. of lactam.

The pure lactam obtained has excellent quality as shown below:

PN—7
Color number—5
Solidifying point—69.2° C.
Volatile base—0.1 mil. equivalent/kg. or smaller Having considered the fact that 1000 parts/hour of the recovered crude lactam contained as much as 100 parts/hour of oligomers and 900 parts/hour of lactam component, it is seen that the process of the present invention enables a pure lactam of excellent quality to be obtained at high yields.

EXAMPLE 2

The lactam component in a recovered crude aqueous lactam having an oligomer content of 13%, a PN of 650 and a color number of 500 or larger is used. The recovered crude aqueous lactam is supplied as a lactam component at the rate of 1000 parts/hour. The lactam component is evaporated in a first evaporation step at 140° C. and the evaporation residue is withdrawn at the rate of 450 parts/hour. Eight hours later, 3600 parts of the evaporation residue accumulated is charged in a depolymerizing tank and after adding thereto 60 parts of phosphoric acid, superheated steam at 400° C. is introduced at the rate of 1300 parts/hour while maintaining the residue at 270° C. The vapor distilled is led into a concentrating tower, associated with the depolymerizing tank, wherein the lactam component is concentrated to obtain 55% aqueous lactam. The PN of the lactam component in the aqueous lactam is 350. Ten parts of $KMnO_4$ aqueous solution is added to the depolymerized aqueous lactam and the mixture is stirred for 3 hours at 40° C. Upon removing $MnO_2$ formed by filtering, the PN of the lactam component is 130. The depolymerized aqueous lactam is then sent to a dehydrating step along with the recovered crude aqueous lactam. The lactam evaporated in the first evaporation step is rectified at the reflux ratio of 30 to remove lower boiling point components. The liquid in the bottom of the rectification tower is evaporated in a second evaporation step at 133° C. and then rectified at the reflux ratio of ¼ to remove higher boiling point components, whereby a pure lactam is obtained at the rate of 870 parts/hour. The liquid in the bottom of the rectification tower is returned to the second evaporation step, while the evaporation residue in the second evaporation step is sent to a dehydrating step along with the depolymerized aqueous lactam and the recovered crude aqueous lactam. A small amount of concentrated NaOH solution is added to the lactams fed to the first and second evaporation steps to control the free base component in the lactams to 50 mil. equivalent per 1 kg. of lactam.

The pure lactam obtained has excellent quality as shown below:

PN—9
Color number—5
Solidifying point—62.9° C.
Voltaile base—0.1 mil. equivalent/kg.

Having considered the fact that 1000 parts/hour of the recovered crude lactam contains 130 parts/hour of oligomer component and 870 parts/hour of lactam component, it is seen that it is possible according to the process of this invention to obtain a pure lactam of excellent quality at a surprisingly high yield.

EXAMPLE 3

The lactam component in a recovered crude aqueous lactam having an oligomer content of 10%, a PN of 500 and a color number of 500 or greater is used. A polymer chip to be simultaneously depolymerized in a depolymerizing step consisted of a gathering of all kinds of nylon 6 polymer chips.

A recovered crude aqueous lactam is supplied at the rate of 1000 parts/hour as a lactam component. In a first evaporation step, the lactam component is evaporated at 135° C. and the evaporation residue is withdrawn at the rate of 400 parts/hour. Eight hours later, 3200 parts of the evaporation residue accumulated and the 2500 parts of the polymer chip were charged into a depolymerizing tank and after adding thereto 85 parts of phosphoric acid, superheated steam at 400° C. is introduced at the rate of 2000 parts/hour while maintaining the mixture at 270° C. The distilled vapor is introduced into a concentrating tower, associated with the depolymerizing tank, wherein the lactam component is concentrated into a 40% aqueous lactam. The PN of the lactam component in the aqueous lactam is 700. Twenty parts of $KMnO_4$ aqueous solution is added to the depolymerized aqueous lactam and the mixture is stirred for 6 hours at 30° C. Upon removing $MnO_2$ formed, the PN of the lactam component is 110. The aqueous lactam is sent to a dehydrating step along with the recovered crude aqueous lactam. The lactam evaporated in the first evaporation step is rectified at the reflux ratio of 30 for removing lower boiling point components. The liquid in the bottom of the rectification tower is evaporated in a second evaporation step at 133° C. and rectified at the reflux ratio of ¼ for removing higher boiling point components, whereby 1090 parts/hour of a pure lactam is obtained. This liquid in the bottom of the rectification tower is sent to the second evaporation step, while the evaporation residue in the second evaporation step is sent to the dehydrating step along with the depolymerized aqueous lactam and the recovered crude aqueous lactam. The lactams fed to the first and second evaporation steps have a small amount of concentrated NaOH solution added thereto, thereby to control the free base component in the lactams to 50 mil. equivalent per 1 kg. of lactam.

The pure lactam obtained had excellent properties as shown below:

PN—7
Color number—5
Solidifying point—69.2° C.
Volatile base—0.1 mil. equivalent/kg.

EXAMPLE 4 (CONTROL)

A recovered crude lactam is purified by the same process as in Example 1 by varying the operational conditions.

A recovered crude lactam having an oligomer content of 10%, a PN of 55 and a color number of 450 is used and is somewhat superior to the material used in Example 1. The recovered crude lactam is supplied at the rate of 1000 parts/hour. In a first evaporation step, the lactam component is evaporated at 255° C. In such a manner that a minimum amount of lactam remains in the evaporation residue. The evaporation residue is produced at the rate of 150 parts/hour which is much smaller than 350 parts/hour in Example 1. The depolymerization of the evaporation residue is omitted. The lactam evaporated in the first evaporation step is rectified to remove lower boiling point components and higher boiling point components therefrom. The lactam evaporating temperature in a second evaporation step is 125° C. The lactams fed to the first and second evaporation steps have a small amount of concentrated NaOH solution added thereto to control the free base component in the lactam to 50 mil. equivalent per 1 kg. of lactam. A purified lactam is obtained at the rate of 810 parts/hour and has a PN of 27 and a color number of 10. Therefore, it cannot be said to be a pure lactam. Further, the yield was lower than that in Example 1. When the evaporation residue is sent to the first evaporation step after converting it into a depolymerized lactam having desired quality by subjecting it to depolmerization and oxidation, the yield of the pure lactam is improved but no improvement is observed in the quality.

EXAMPLE 5 (CONTROL)

A recovered crude lactam is purified by the same process as in Example 2 by varying the operational conditions. A recovered crude lactam having an oligomer content of 10%, a PN of 55 and a color number of 500 is used and is therefore somewhat superior in quality than that used in Example 2. The recovered crude lactam is supplied at the rate of 1000 parts/hour. In a first evaporating step, the lactam component is evaporated at 140° C. and the evaporation residue is withdrawn at the rate of 350 parts/hour. Eight hours later, 2800 parts of the evaporation residue accumulated is charged in a depolymerizing tank and after adding thereto 50 parts of phosphoric acid, superheated aqueous vapor at 350° C. is itnroduced at the rate of 1100 parts/hour while maintaining the residue at 270° C. The distilled vapor is led into a concentration tower, associated with the depolymerizing tank, wherein the lactam component is concentrated into 35% aqueous lactam. The PN of the lactam component in the aqueous lactam is 350. Without subjecting to oxidation, the depolymerized aqueous lactam is dehydrated with the recovered crude aqueous lactam. The lactam evaporated in the first evaporation step is rectified at the reflux ratio of 30 for removing lower boiling point component therefrom. This liquid in the bottom of the rectification tower is evaporated in a second evaporation step at 133° C. and rectified at the reflux ratio of ¼ for removing higher boiling point components therefrom, whereby a pure lactam is obtained at the rate of 880 parts/hour. The lactams fed to the first and second evaporation steps have a small amount of concentrated NaOH solution added thereto to control the free base component in the lactams to 50 mil. equivalent per 1 kg. of lactam. The purified lactam is not a pure lactam, as it had a PN of 18 and a color number of 15.

Although in the examples illustrated above, the lactam evaporated in the first evaporation step is first rectified for removing lower boiling point components and after processed through the second evaporation step, rectified for removing higher boiling point components, the lactam from which the lower boiling point components have been removed by rectification, may be fed directly into the rectification tower for removing the higher boiling point components and the liquid in the bottom of the rectification tower may be treated in the second evaporation step. Alternatively, the lactam evaporated in the first evaporation step may be rectified for removing the lower boiling point components and higher boiling point components all at once. Further, in feeding the depolymerized lactam or the evaporation residue in the second evaporation step to the evaporation step and the distillation step, they may be processed through the dehydrating step by adding them to the crude aqueous lactam or may be mixed after dehydrating them respectively.

We claim:
1. A process for the preparation of pure caprolactam from an oligomer-containing crude caprolactam which comprises:
   (a) evaporating said oligomer-containing crude caprolactam to separate crude caprolactam from said oligomer-containing crude caprolactam at a temperature less than about 150° C.,
   (b) while maintaining said oligomer-containing crude caprolactam under alkaline conditions, depolymerizing said oligometer-containing crude caprolactam mixture,
   (c) treating said depolymerized mixture with an oxidizing material at a temperature sufficient to oxidize intractable impurities or impurities which cannot be substantially purified,
   (d) rectifying said treated depolymerized material along with the recovered lactam of step (a).

2. The process of claim 1, wherein the oligomer-containing crude caprolactam separated from said crude caprolactam is subjected to further processing steps comprising:
   (a) depolymerizing said oligomer-containing crude caprolactam in the presence of an acidic catalyst at a temperature within the range from about 220° C. to about 350° C. and at a pressure within the range from about 0.5 to about 6 atmospheres,
   (b) treating said depolymerized material by oxidation until the permanganate number of the lactam is below 1.50,
   (c) combining the crude caprolactam of step (a) with the depolymerized material of step (c),
   (d) refluxing the low boiling material at a reflux ratio at least greater than 2 to 1,
   (e) dehydrating said material to at least about 5% water content, and
   (f) recirculating said material to said evaporating step.

3. The process of claim 1, wherein the evaporation consists of more than one step.

4. The process of claim 1, wherein the acidic catalyst is phosphoric acid.

References Cited
UNITED STATES PATENTS

| | | | |
|---|---|---|---|
| 2,667,483 | 1/1954 | Zeegers | 260—239.3 |
| 2,952,675 | 9/1960 | Bolle | 260—239.3 |
| 3,145,198 | 8/1964 | Mordidelli et al. | 260—239.3 |
| 3,182,055 | 5/1965 | Bonfield et al. | 260—239.3 |
| 3,459,640 | 8/1969 | Tsunawki et al. | 260—239.3 |

HENRY R. JILES, Primary Examiner

R. T. BOND, Assistant Examiner